United States Patent [19]

Han

[11] Patent Number: 5,254,889
[45] Date of Patent: Oct. 19, 1993

[54] MOSFET ANALOG MULTIPLIER

[75] Inventor: Il S. Han, Seoul, Rep. of Korea

[73] Assignee: Korea Telecommunication Authority, Rep. of Korea

[21] Appl. No.: 900,331

[22] Filed: Jun. 18, 1992

[30] Foreign Application Priority Data

Nov. 1, 1991 [KR] Rep. of Korea ............ 91-19374

[51] Int. Cl.$^5$ .............................................. G06G 7/16
[52] U.S. Cl. .................................. 307/529; 307/201; 364/841
[58] Field of Search ............... 307/201, 498, 529; 328/160; 330/277; 364/807, 841

[56] References Cited

U.S. PATENT DOCUMENTS 5,061,866 10/1991 El-Naggar et al. ............ 307/201 X

OTHER PUBLICATIONS

New Four-Quadrant CMOS Analogue Multiplier, Electronics Letters 19th Nov. 1987, vol. 23, pp. 1268–1270.
A20-V Four-Quardant CMOS Analogue Multiplier, IEE Journal of Solid-State Circuit, vol. SC-20, No. 6, Dec. 1985, pp. 1158–1167.

*Primary Examiner*—James B. Mullins
*Attorney, Agent, or Firm*—Seed and Berry

[57] ABSTRACT

A MOSFET analog multiplier with a variable resistive MOSFET linear means for linearly varying output current I depending upon a symmetrical input voltage from voltage sources V2 and −V2 and an input voltage from an input voltage source V1 operatively associated with the symmetrical input voltage from the voltage source V2 and −V2, with the variable resistive MOSFET linear means having a node A to output the varied output current I therethrough is disclosed. An operational amplifying unit for amplifying the linearly varied output current I and which includes an operational amplifier U with an inverting input terminal connected to the node A of the MOSFET linear means, a non-inverting input terminal connected to ground, and an output terminal. The operational amplifying unit further includes a feedback element Z connected between the inverting input terminal and the output terminal of the operational amplifier U, where in use the output terminal outputs a voltage Vo.

14 Claims, 4 Drawing Sheets

MOSFET ANALOG MULTIPLIER

BACKGROUND OF THE INVENTION

1. Field of the Invention

The invention relates to a variable resistive MOSFET analog multiplier, and more particularly, to a variable resistive MOSFET analog multiplier by employing a variable resistive MOSFET linear means which includes two MOSFETs to remove the non-linear current of the MOSFET, thereby considerably improving the accuracy of the multiplier.

2. Information Disclosure Statement

Recently, upon developing the VLSI (Very Large Scale Integration) technology, a need arose to bring the integration technology not only into the digital system, but also into the analog system. Thus, the digital technology is not only utilized in for example, computers, but also is applied to a novel field capable of accomplishing either a humanization or realization of a neural network of communication technics between remote controlled systems or between user connections. Under the circumstances, there are limits in the digital system of the prior art VLSI technology both from a classical sense of an algorithm aspect, and from a simulated realization aspect, that is, a real connection from the external. For the multiplication process, which is based on a procedure utilizing VLSI technology, problems result since the width required for the necessary chips increases considerably and the system operational speed for realizing the synchronizing operation of the system is limited.

In addition, the technology of the analog integrated circuit has difficulty in realizing the VLSI technology due to its restricted precision and difficulty in the system design itself.

Therefore, it is an object of the present invention to solve the problems set forth above and to provide a MOSFET analog multiplier which provides precise function of the operational multiplication utilizing both VLSI technology which has the advantage of being a digital system and a novel analog integrated circuit.

Further, it is an another object of the present invention to provide a analog-digital hybrid type of artificial neural synapse to realize a scheme for a new generation of computer technology.

The preceding objects should be construed as merely presenting a few of the more pertinent features and applications of the present invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The MOSFET analog multiplier of the present invention is defined by the claims with a specific embodiment shown in the attached drawings. For the purpose of summarizing the invention, the invention relates to a MOSFET analog multiplier which comprises a variable resistive MOSFET linear means 20 which includes a MOSFET Q1 having a gate electrode connected to a voltage source V1, a drain electrode connected to a voltage source V2 and a source electrode. A MOSFET Q2 with a source electrode and a gate electrode is connected to a voltage source $-V2$ and a drain electrode, with the voltage sources V2 and $-V2$ providing symmetrical input voltage, in use, and with the source electrode of the MOSFET Q1 and the drain electrode of the MOSFET Q2 being connected to a node A. The node A outputs, in use, a linearly varied current I. An operational amplifying unit 10 which includes an operational amplifier U, for amplifying the linearly varied output current I. The operational amplifier U has an inverting input terminal connected to the first node A of the variable resistive MOSFET linear means 20 and a non-inverting input terminal connected to the ground, and an output terminal. A feedback element Z is connected to the inverting input terminal and to the output terminal with the output terminal outputting, in use, a variable voltage Vo.

The MOSFET analog multiplier may further include a MOSFET Q3 operatively interposed between the node A and the inverting input terminal of the operational amplifier U of the operational amplifying unit 10, with the MOSFET Q3 having a gate electrode to enable an input signal of a neural state to be inputted therethrough.

The MOSFET analog multiplier may further include a MOSFET Q4 operatively interposed between the voltage source V2 and the drain electrode of the MOSFET Q1 of the variable resistive MOSFET linear means 20, and a MOSFET Q5 operatively interposed between the voltage source $-V2$ and the source electrode and the gate electrode of the MOSFET Q2, with the gate electrodes of the MOSFETs Q4 and Q5 being interconnected to enable an input signal of a neural state to be inputted therethrough.

In the MOSFET analog multiplier MOSFETs Q1 and Q2 are preferably depletion mode MOSFETs.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout the several views of the drawings.

DETAILED DESCRIPTION OF THE INVENTION

Figure 1A:
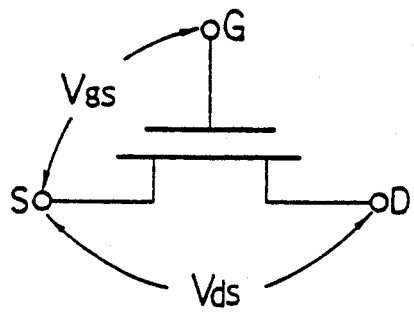
FIG. 1A illustrates a symbol of a MOSFET.
Figure 1B:
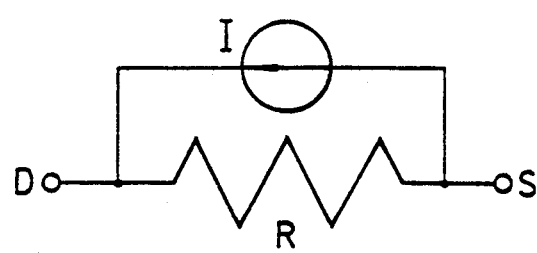
FIG. 1B illustrates an equivalent circuit a in non-saturation region of MOSFET.
Figure 2:
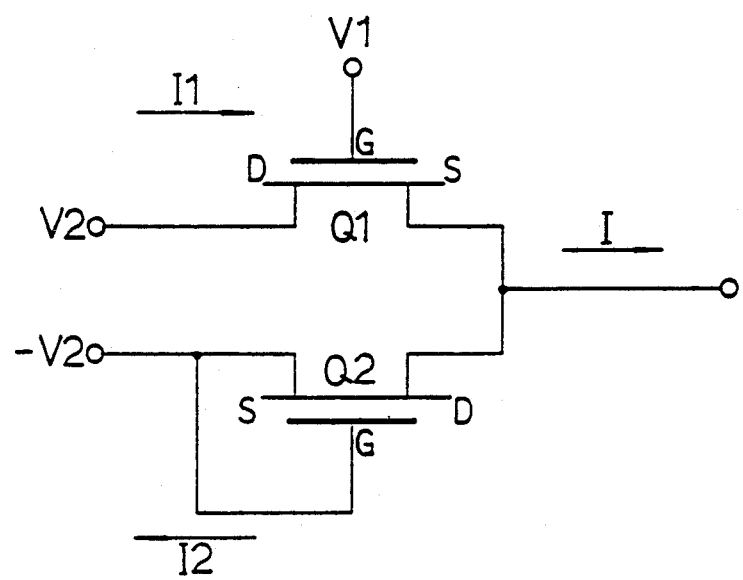
FIG. 2 illustrates a principle circuit according to the present invention.

FIG. 1A diagrammatically illustrates a symbol of MOSFET having a gate electrode, a source electrode and a drain electrode. FIG. 1B shows an equivalent circuit of a MOSFET in a non-saturation region, in which the drain current characteristics at the resistance region can be expressed by the equations as follows:

$$I = \frac{Cox \cdot W \cdot \mu}{L} \cdot \frac{V^2_{ds}}{2} \quad (1)$$

$$R = \frac{1}{(Cox \cdot W \cdot \mu)/L \, (Vgs - Vt)} \quad (2)$$

where $\mu$: the mobility of the majority carrier
Cox: the gate capacitance per unit area
L: the length of the channel
W: the width of the channel (perpendicular direction to L)
Vds: the voltage between the drain electrode and the source electrode
Vgs: the voltage between the gate electrode and the source electrode
Vt: the threshold voltage FIG. 2 is a schematic view of the present invention in which, in order to eliminate the non-linear current component from the equation (1), two MOSFETs Q1 and Q2 (which are depletion type) are used as illustrated, in which the source electrode of the MOSFET Q1 is connected to the drain electrode of the MOSFET Q2 to output a current I therefrom. The gate electrode of the MOSFET Q1 is connected to a voltage source V1 for operational input and the drain electrode thereof is connected to a voltage source V2 for operational input, respectively, to cause current I1 to flow from the side of the voltage source V2 to the MOSFET Q1. The source electrode of the MOSFET Q2 is connected to the voltage source −V2 for operational input and is also connected to the gate electrode thereof to cause current I2 to flow from the MOSFET Q2 to the side of the voltage source −V2. As fully appreciated, the voltage sources V2 and −V2 supply symmetrical input voltages to the MOSFETs Q1 and Q2, simultaneously.

Therefore, the characteristics between the voltage and the current of the MOSFETS Q1 and Q2 can be expressed by the following equations.

The characteristic between voltage and current of the MOSFET Q1 is depicted as follows:

$$I1 = (Cox \cdot W \cdot u)/L[(Vgs - Vt) \cdot Vds - V^2ds/2] \quad (3)$$

and, the characteristic between voltage and current of the MOSFET Q2 is given as follows:

$$I2 = (Cox \cdot W \cdot u)/L[(-Vt) \cdot Vds - V^2ds/2] \quad (4).$$

Therefore, the resulting relationship between voltage and current can be calculated using the equations (3) and (4) as follows:

$$\begin{aligned} I &= I1 - I2 \\ &= (Cox \cdot W \cdot \mu)/L \, [Vgs \cdot Vds] \\ &= a \cdot Vgs \cdot Vds, \end{aligned} \quad (5)$$

where, $a = (Cox \cdot X \cdot \mu)/L$.

From the above, it can be appreciated that the quadratic term is eliminated from the results.

Figure 3:
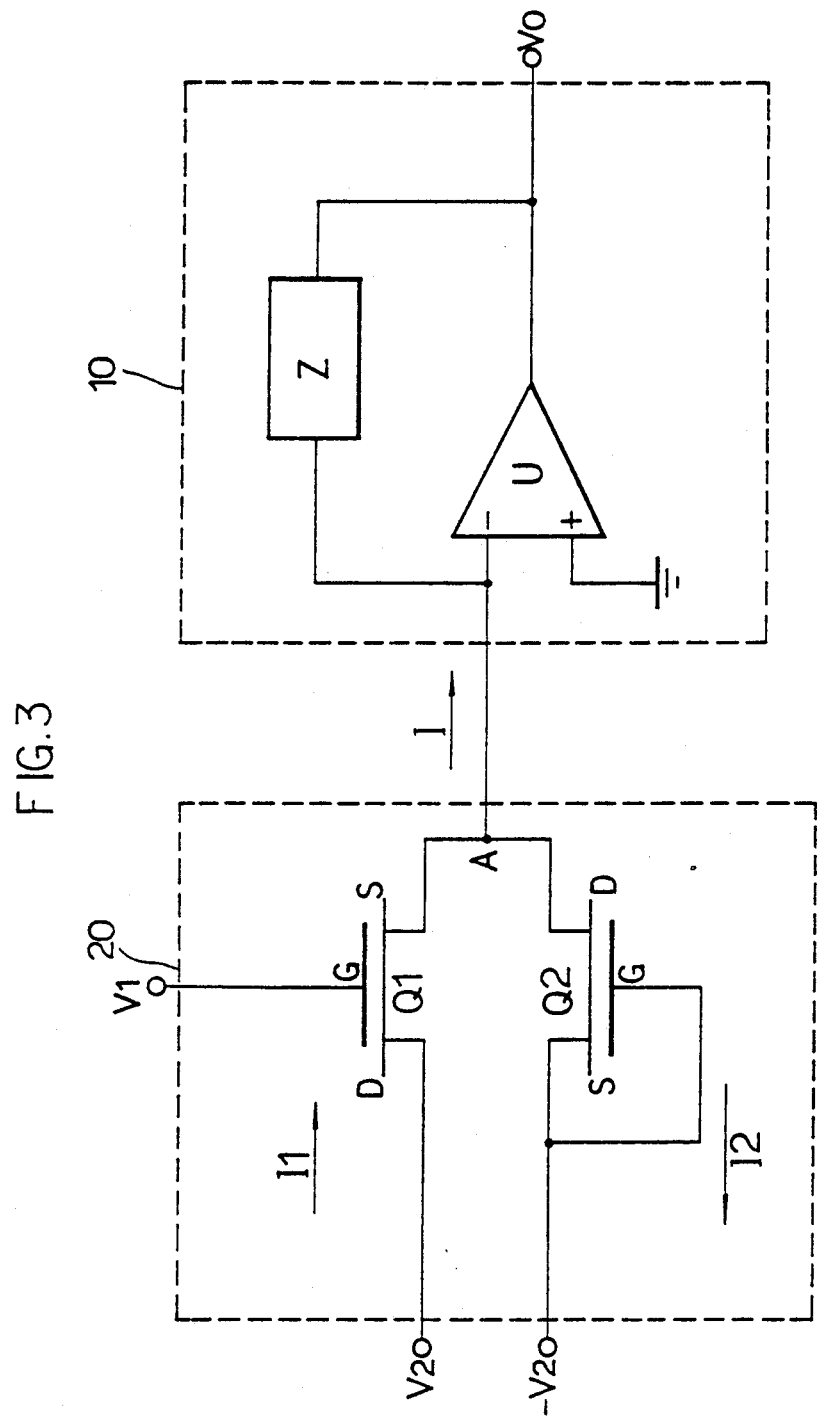
FIG. 3 illustrates a circuit of a MOSFET analog multiplier according to the present invention.

FIG. 3 illustrates a circuit of a MOSFET analog multiplier according to the present invention. Referring to the drawing, a variable resistive MOSFET linear means 20 is shown in which the gate electrode of the MOSFET Q1 is connected to a voltage source V1 for operational input and the drain electrode thereof, which is one input terminal, is connected to a voltage source V2 for operational input, respectively. The source electrode of the MOSFET Q2, which is the other input terminal is connected to the voltage source −V2 for operational input and is connected to the gate electrode thereof. The source electrode of MOSFET Q1 is connected to the drain electrode of the MOSFET Q2, where the connection therebetween, i.e., node A, is connected to an inverting input terminal of an operational amplifier U of an operational amplifying unit 10. A non-inverting input terminal of the operational amplifier U is connected to the ground and an output terminal thereof is connected through a feedback element Z to their inverting input terminal, the operational description of which will be described hereinafter.

Referring to the drawing, the output voltage Vo obtained from both the respective currents I1 and I2 flowing through the MOSFETs Q1 and Q2, and the feedback element Z is given a value which is in proportion to the product of the input voltages from the voltage sources V1 (Vgs) and V2 (Vds), respectively. The results of such an operational function can be obtained through a simple and novel circuit by utilizing a primary linear feature of MOSFET as clearly opposed to the prior art circuit.

Figure 4:
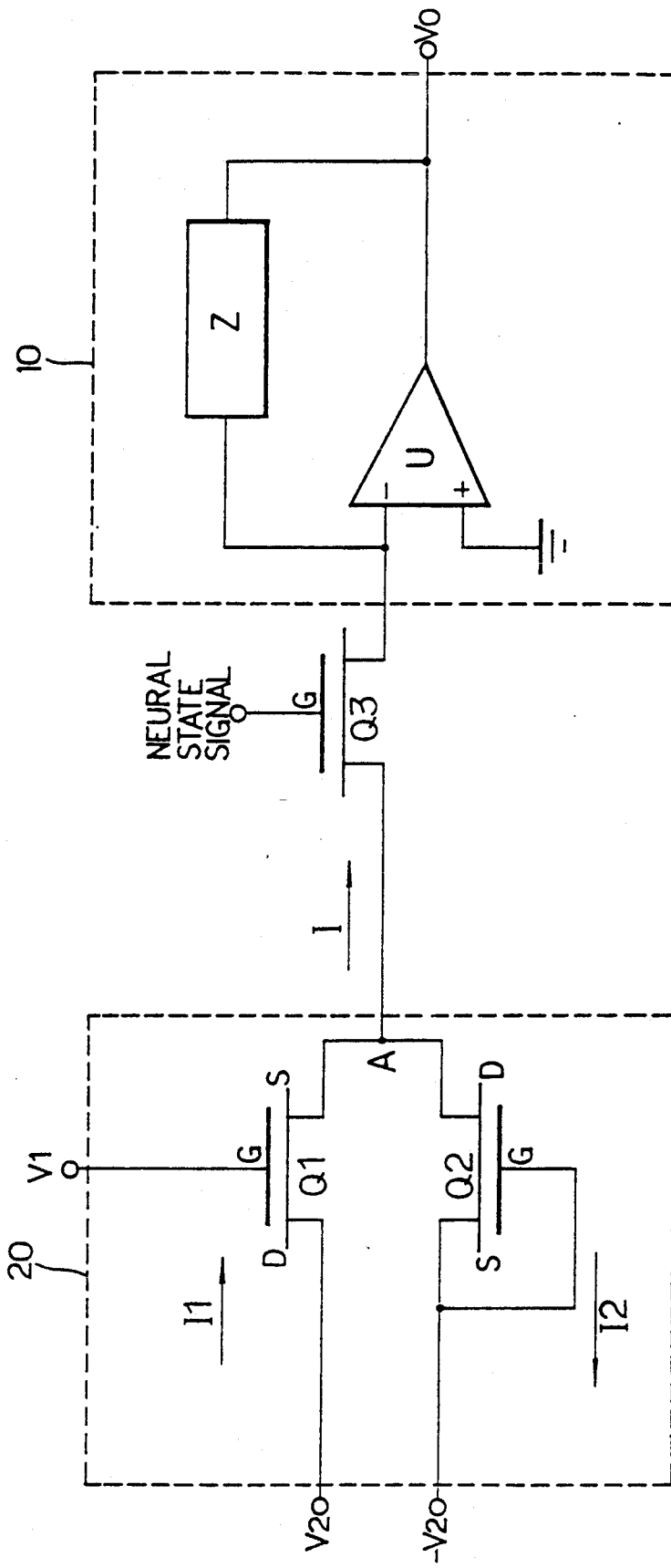
FIG. 4 illustrates a first embodiment of the present invention.

FIG. 4 illustrates a first embodiment of the present invention in which, in connection with FIG. 3, a MOSFET Q3 is connected between the variable resistive MOSFET linear means 20 and the inverting input terminal of the operational amplifier U of the operational amplifying unit 10, so as to input the neural state signal through the gate electrode thereof. According to the embodiment mentioned above, if the input voltage of the voltage source V2 of the MOSFET linear means 20 is set to a predetermined level and the input voltage of the voltage source V1 functions as a synapse weight of a neural network when in operation, a novel circuit for realizing the basic structure of hybrid neural synapse network which stores the neural state into electrical forms by using a feedback capacitor, not shown, can be obtained.

Figure 5:
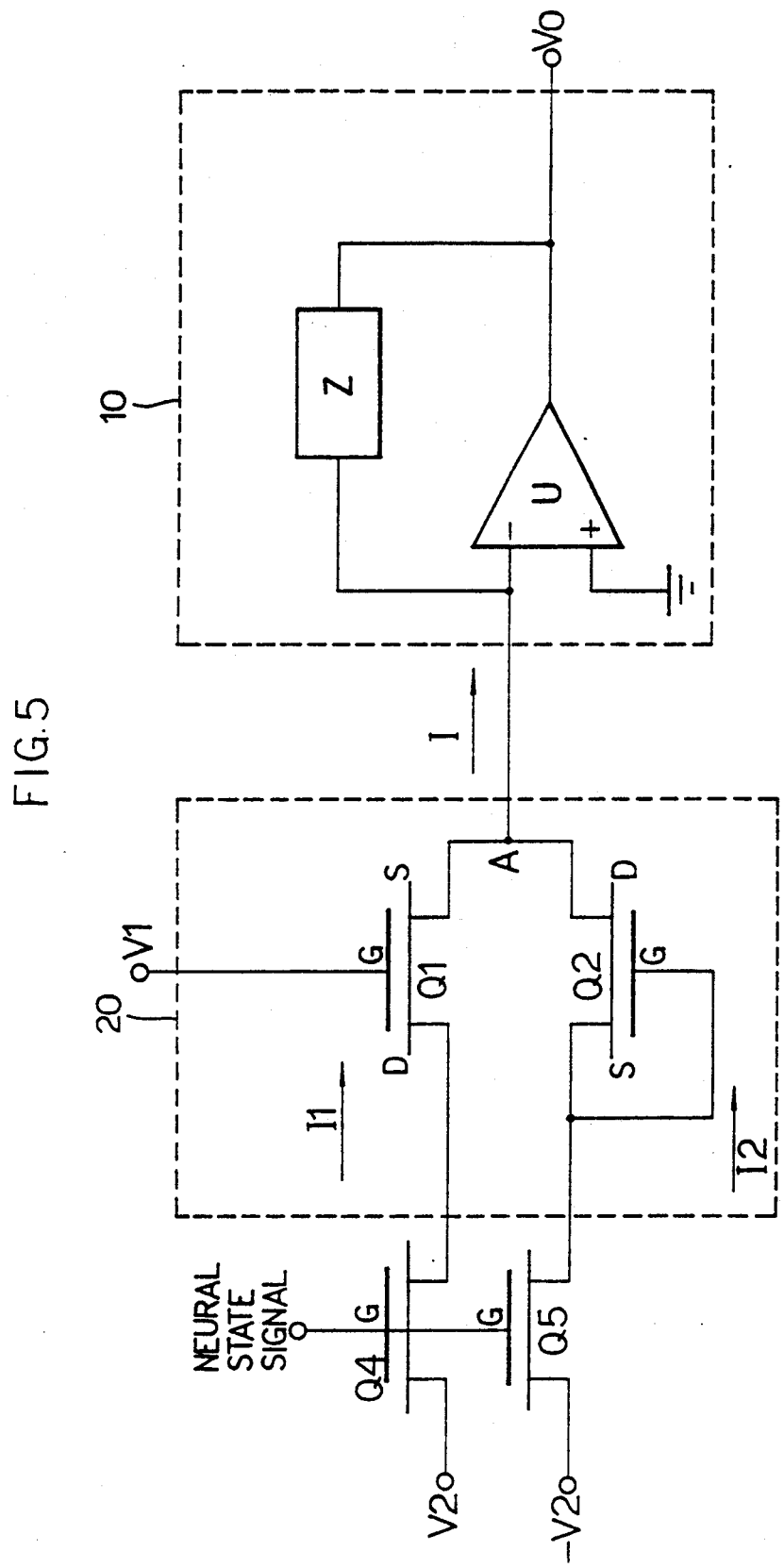
FIG. 5 illustrates a second embodiment of the present invention.

FIG. 5 shows a second embodiment of the present invention. In relation to FIG. 3, MOSFETs Q4 and Q5 are operatively interposed between the voltage sources V2 and −V2 and the MOSFET linear means 20 to receive the voltage sources V2 and −V2, respectively, and the gate electrodes thereof are connected relative to each other, thereby enabling the input signal of the neural state to be inputted therethrough. Therefore, if there is no input signal applied thereto, the consumption current existing at the MOSFETs Q1 and Q2 can be eliminated. According to the second embodiment of the present invention described above, another novel neural synapse network to minimize the consumption of the power required for highly integrity of the system can be obtained.

As described above, according to the invention, it can be obtained a simple and an accurate operational results by utilizing the primary linear characteristics of MOSFET. It can also be accomplished a novel neural synapse network that though it utilities a few MOSFETs, yet it is possible to obtain a completely a synchronous operation having a high speed in processing time.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. A MOSFET analog multiplier comprising:
   a MOSFET Q1 having a gate electrode connected to a voltage source V1, a drain electrode connected to a voltage source V2 and a source electrode;
   a MOSFET Q2 having a source electrode and a gate electrode connected to a voltage source $-V2$ and a drain electrode, with said voltage sources V2 and $-V2$ providing symmetrical input voltages in use and with said source electrode of said MOSFET Q1 and said drain electrode of said MOSFET Q2 being connected to a node A which outputs, in use, a linearly variable current I to define a variable resistive MOSFET linear means;
   an operational amplifier U for amplifying said linearly varied output current I and including an inverting input terminal connected to said first node A of said variable resistive MOSFET linear means and a non-inverting input terminal connected to the ground, and an output terminal; and
   a feedback element Z connected to said inverting input terminal and to said output terminal to define an operational amplifying unit for outputting, in use, a voltage Vo; and
   a MOSFET Q3 operatively interposed between said node A and said inverting input terminal of said operational amplifier U, with said MOSFET Q3 having a gate electrode to enable an input signal of a neural state to be inputted therethrough.

2. The MOSFET analog multiplier of claim 1 wherein said MOSFETs Q1 and Q2 are depletion mode MOSFETs.

3. A MOSFET analog multiplier comprising:
   a MOSFET Q1 having a gate electrode connected to a voltage source V1, a drain electrode connected to a voltage source V2 and a source electrode;
   a MOSFET Q2 having a source electrode and a gate electrode connected to a voltage source $-V2$ and a drain electrode, with said voltage sources V2 and $-V2$ providing symmetrical input voltages in use and with said source electrode of said MOSFET Q1 and said drain electrode of said MOSFET Q2 being connected to a node A which outputs, in use, a linearly variable current I to define a variable resistive MOSFET linear means;
   an operational amplifier U for amplifying said linearly varied output current I and including an inverting input terminal connected to said first node A of said variable resistive MOSFET linear means and a non-inverting input terminal connected to the ground, and an output terminal; and
   a feedback element Z connected to said inverting input terminal and to said output terminal to define an operational amplifying unit for outputting, in use, a voltage Vo;
   a MOSFET Q4 operatively interposed between said voltage source V2 and said drain electrode of said MOSFET Q1 of said variable resistive MOSFET linear means; and
   a MOSFET Q5 operatively interposed between said voltage source $-V2$ and said source and said gate electrodes of said MOSFET Q2, and with said gate electrodes of said MOSFETs Q4 and Q5 being interconnected to enable an input signal of a neural state to be inputted therethrough.

4. The MOSFET analog multiplier of claim 3 wherein said MOSFETs Q1 and Q2 are depletion mode MOSFETs.

5. A MOSFET analog multiplier comprising:
   a variable resistive MOSFET linear means 20 for linearly varying output current I depending upon a symmetrical input voltage from voltage sources V2 and $-V2$ and an input voltage from an input voltage source V1 operatively associated with said symmetrical input voltage from said voltage source V2 and $-V2$, with said variable resistive MOSFET linear means 20 having a node A to output said linearly varied output current I therethrough;
   an operational amplifying unit 10 for amplifying said linearly varied output current I, with said operational amplifying unit including an operational amplifier U having an inverting input terminal connected to said node A of said MOSFET linear means 20, a non-inverting input terminal connected to the ground, and an output terminal, said operational amplifying unit 10 further including a feedback element Z connected between said inverting input terminal and said output terminal of said operational amplifier U; and,
   a MOSFET Q3 operatively interposed between said node A of said MOSFET linear means 20 and said inverting input terminal of said operational amplifier U of said operational amplifying unit 10, said MOSFET Q3 further including a gate electrode for receiving the input signal of a neural state, such that in use said MOSFET Q3 operates as a hybrid neural synapse circuit upon receiving said input signal of said neural state through said gate electrode of said MOSFET Q3.

6. The multiplier of claim 5 wherein said MOSFET linear means 20 includes a MOSFET Q1 having a source electrode connected to said node A of said MOSFET linear means 20, a gate electrode connected to said voltage source V1, and a drain electrode connected to said voltage source V2; and,
   a MOSFET Q2 having a drain electrode connected to said node A, a gate electrode and a source electrode, with said gate and source electrode being connected to each other to connect to said voltage source $-V2$.

7. The MOSFET analog multiplier of claim 6 wherein said MOSFETs Q1 and Q2 are depletion mode MOSFETs.

8. A MOSFET analog multiplier comprising:
   a variable resistive MOSFET linear means 20 for linearly varying output current I depending upon a symmetrical input voltage from voltage sources V2 and −V2 and an input voltage from an input voltage source V1 operatively associated with said symmetrical input voltage from said voltage source V2 and −V2, with said variable resistive MOSFET linear means 20 having a node A to output said linearly varied output current I therethrough;

an operational amplifying unit 10 for amplifying said linearly varied output current I, with said operational amplifying unit including an operational amplifier U having an inverting input terminal connected to said node A of said MOSFET linear means 20, a non-inverting input terminal connected to the ground, and an output terminal, said operational amplifying unit 10 further including a feedback element Z connected between said inverting input terminal and said output terminal of said operational amplifier U;

a MOSFET Q4 operatively interposed between said voltage source V2 and said variable resistive MOSFET linear means 20 to receive said input voltage from said voltage source V2; and a MOSFET Q5 operatively interposed between said voltage source −V2 and said variable resistive MOSFET linear means 20 to receive said input voltage from said voltage source −V2, with each said MOSFET Q4 and Q5 having gate electrodes interconnected to each other to enable an input signal of a neural state to be inputted therethrough, such that in use each said MOSFET Q4 and Q5 operate as a hybrid neural synapse circuit upon receiving said input signal of said neural state through each said gate electrode of each said MOSFET Q4 and Q5.

9. The multiplier of claim 8 wherein said MOSFET linear means 20 includes a MOSFET Q1 having a source electrode connected to said node A of said MOSFET linear means 20, a gate electrode connected to said voltage source V1, and a drain electrode connected to said voltage source V2; and a MOSFET Q2 having a drain electrode connected to said node A, a gate electrode and a source electrode, with said gate and source electrode being connected to each other to connect to said voltage source −V2.

10. The MOSFET analog multiplier of claim 9 wherein said MOSFETs Q1 and Q2 are depletion mode MOSFETs.

11. A MOSFET analog multiplier comprising:

a variable resistive MOSFET linear means 20 which includes a MOSFET Q1 having a gate electrode connected to a voltage source V1, a drain electrode connected to a voltage source V2 and a source electrode; 'a MOSFET Q2 having a source electrode and a gate electrode connected to a voltage source −V2 and a drain electrode, with said voltage sources V2 and −V2 providing symmetrical input voltages in use and with said source electrode of said MOSFET Q1 and said drain electrode of said MOSFET Q2 being connected to a node A which outputs, in use, a linearly variable current I;

an operational amplifying unit 10 which includes an operational amplifier U for amplifying said linearly varied output current I and including an inverting input terminal connected to said first node A of said variable resistive MOSFET linear means 20 and a non-inverting input terminal connected to the ground, and an output terminal;

a feedback element Z connected to said inverting input terminal and to said output terminal with said output terminal outputting, in use, a voltage Vo; and a MOSFET Q3 operatively interposed between said node A and said inverting input terminal of said operational amplifier U of said operational amplifying unit 10, with said MOSFET Q3 having a gate electrode to enable an input signal of a neural state to be inputted therethrough.

12. The MOSFET analog multiplier of claim 11 wherein said MOSFETs Q1 and Q2 are depletion mode MOSFETs.

13. A MOSFET analog multiplier comprising:

a variable resistive MOSFET linear means 20 which includes a MOSFET Q1 having a gate electrode connected to a voltage source V1, a drain electrode connected to a voltage source V2 and a source electrode;

a MOSFET Q2 having a source electrode and a gate electrode connected to a voltage source −V2 and a drain electrode, with said voltage sources V2 and −V2 providing symmetrical input voltages in use and with said source electrode of said MOSFET Q1 and said drain electrode of said MOSFET Q2 being connected to a node A which outputs, in use, a linearly variable current I;

an operational amplifying unit 10 which includes an operational amplifier U for amplifying said linearly varied output current I and including an inverting input terminal connected to said first node A of said variable resistive MOSFET linear means 20 and a non-inverting input terminal connected to the ground, and an output terminal; and a feedback element Z connected to said inverting input terminal and to said output terminal with said output terminal outputting, in use, a voltage Vo;

a MOSFET Q4 operatively interposed between said voltage source V2 and said drain electrode of said MOSFET Q1 of said variable resistive MOSFET linear means 20; and a MOSFET Q5 operatively interposed between said voltage source −V2 and said source and said gate electrodes of said MOSFET Q2, and with said gate electrodes of said MOSFETs Q4 and Q5 being interconnected to enable an input signal of a neural state to be inputted therethrough.

14. The MOSFET analog multiplier of claim 13 wherein said MOSFETs Q1 and Q2 are depletion mode MOSFETs.

* * * * *

UNITED STATES PATENT AND TRADEMARK OFFICE
CERTIFICATE OF CORRECTION

PATENT NO. : 5,254,889
DATED : October 19, 1993
INVENTOR(S) : H.S. Han

It is certified that error appears in the above-indentified patent and that said Letters Patent is hereby corrected as shown below:

Column 7, claim 11, line 55, " 'a MOSFET" should read --a MOSFET--,indent the paragraph beginning with "a MOSFET Q2 having a source electrode..."

Signed and Sealed this

Second Day of August, 1994

Attest:

BRUCE LEHMAN

Attesting Officer   Commissioner of Patents and Trademarks